United States Patent
Kanki

[19]
[11] Patent Number: 6,085,668
[45] Date of Patent: Jul. 11, 2000

[54] TOP BOARD FOR TABLES, SHELVES OR THE LIKE AND A CONNECTOR FOR BOARD SECTIONS FORMING THE TOP BOARD OR THE LIKE

[75] Inventor: Motoyuki Kanki, Kakogawa, Japan

[73] Assignee: Yoshimi Trading Company Limited, Kakogawa, Japan

[21] Appl. No.: 09/320,266

[22] Filed: May 27, 1999

[51] Int. Cl.[7] .................................................. A47B 1/00
[52] U.S. Cl. ............................................. 108/65; 108/64
[58] Field of Search .................................. 108/64, 65, 66, 108/69; 403/329, 326

[56] References Cited

U.S. PATENT DOCUMENTS

| | | | |
|---|---|---|---|
| 4,150,630 | 4/1979 | Pokorny et al. | 108/64 |
| 4,665,836 | 5/1987 | Burr | 108/64 |
| 4,686,910 | 8/1987 | Skjerseth | 108/65 X |
| 5,162,029 | 11/1992 | Wilkinson | 108/65 |
| 5,595,126 | 1/1997 | Yeh | 108/65 X |
| 5,678,948 | 10/1997 | White | 108/64 X |

*Primary Examiner*—Jose V. Chen
*Attorney, Agent, or Firm*—Armstrong, Westerman, Hattori, McLeland & Naughton

[57] ABSTRACT

Provided is a top board for a table, shelves or the like comprising a plurality of board sections to be connected laterally with one another by use of at least one connector, the board section having an engaging part on the laterial sides, into which the connector is inserted to connect the plural board sections.

The disclosure also provides a connector which is mounted to an end of the board section to connect a plurality of board sections in users discretion.

8 Claims, 5 Drawing Sheets

TOP BOARD FOR TABLES, SHELVES OR THE LIKE AND A CONNECTOR FOR BOARD SECTIONS FORMING THE TOP BOARD OR THE LIKE

BACKGROUND OF THE INVENTION

1. Field of the Invention

The present invention relates to a top board or slab for tables, shelves, etc., and a connector for board sections forming the table top boards, etc.

2. Prior Art

Appeared on the market in recent years are various types of sectional or knockdown furniture for which users may freely make arrangement in their discretion, or tables or the like which may be used particularly for outdoor recreation such as camping and can be freely set up and taken apart. Conventionally, the top board or slab is hinged to be folded or legs or base frames may be detached from the top board for users arrangement and facilitated portability without bulkiness.

The sectional or knockdown furniture is used installed usually inside the houses. In case that the top board has a specific or limited shape and size, the extent of users free arrangement of furniture is limited extreamly. Also, tables for outdoor use, in case the top board is not adapted to be taken apart, do not fully achieve the task of avoiding bulkiness in carriage.

An object of the present invention is to provide a top board or slab for use in sectional or knockdown furniture, folding furniture, or the like, without the foregoing problems in the prior art.

The present invention provides a top board for tables, shelves or the like comprising a plurality of board sections, the board sections each having on lateral sides an engaging part for receiving a connector, so that the connector is inserted into the engaging part to cause a fixing means formed on the board section to fit in a fit part on the connector, thereby fixing the plural board sections assembled. The present invention also provides a connector for a plurality of board sections comprising a mounting member to be set on the board section laterally having an engaging part and a connection member to be engaged with and retained by the engaging part, the mounting member having a fixing means, the connection member having a fit part, so that the connection member is inserted into the engaging part to cause the fixing means to fit in the fit part on the connection member, thereby enabling users to freely make arrangement of the top board, shelves or the like in size and shape by use of the connectors on a plurality of board sections.

PREFERRED EMBODIMENTS OF THE INVENTION

EXAMPLES

Figure 1:
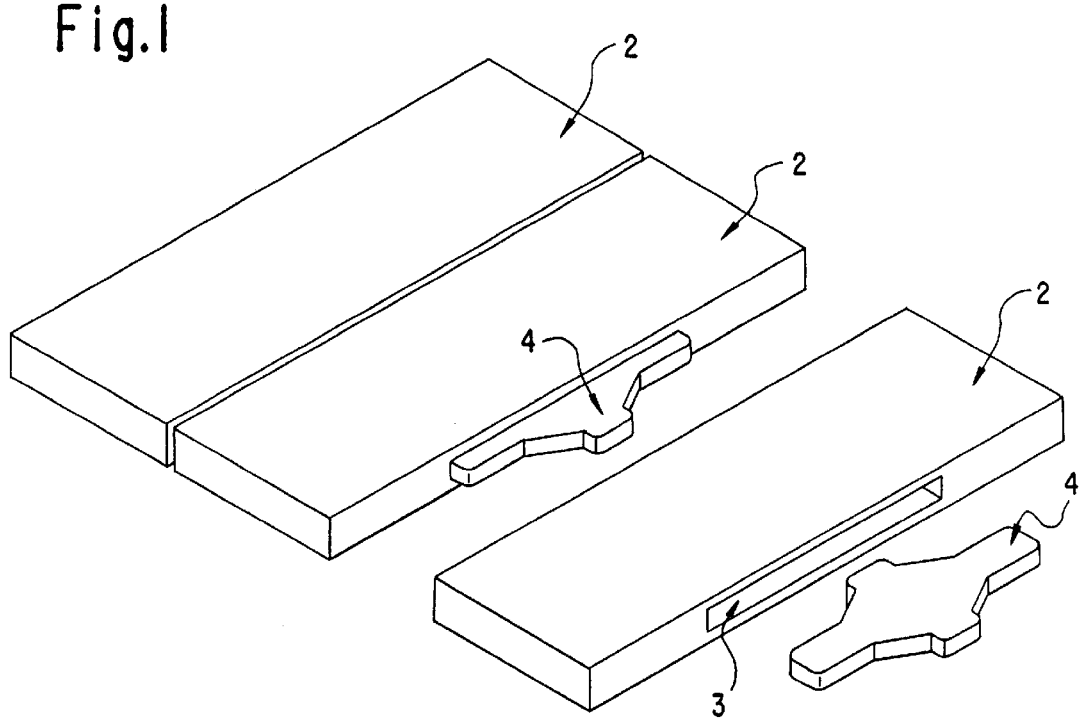
FIG. 1 is a perspective view showing the structure of board sections for forming a top board according to the present invention.
Figure 2:
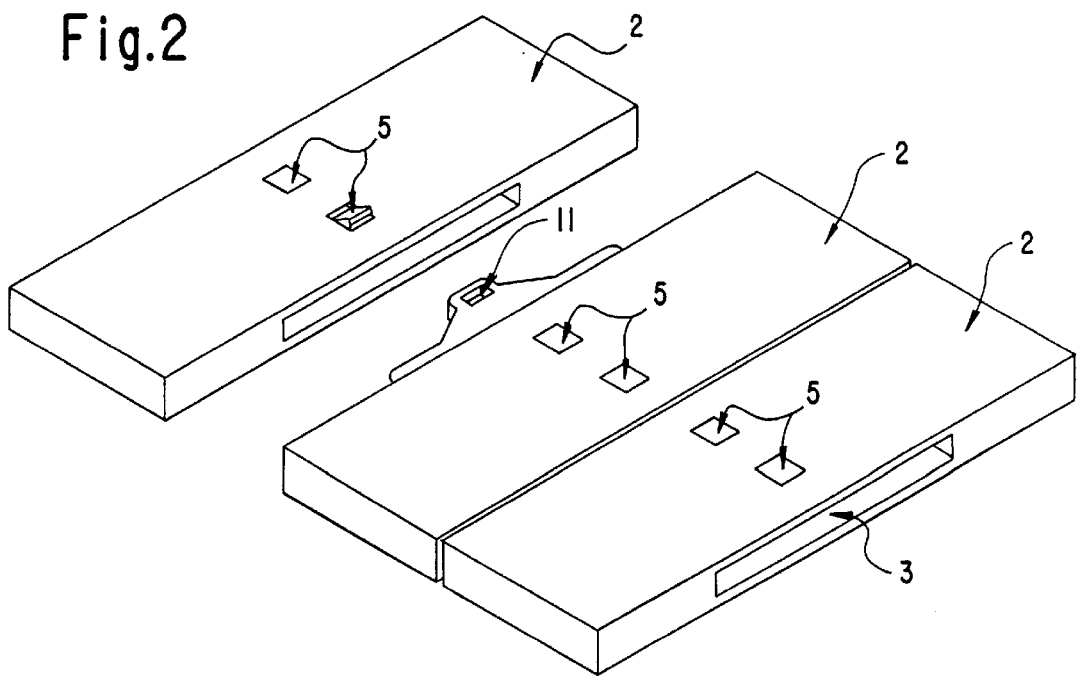
FIG. 2 is a perspective view showing the structure of the rear surface of the board sections.
Figure 3:
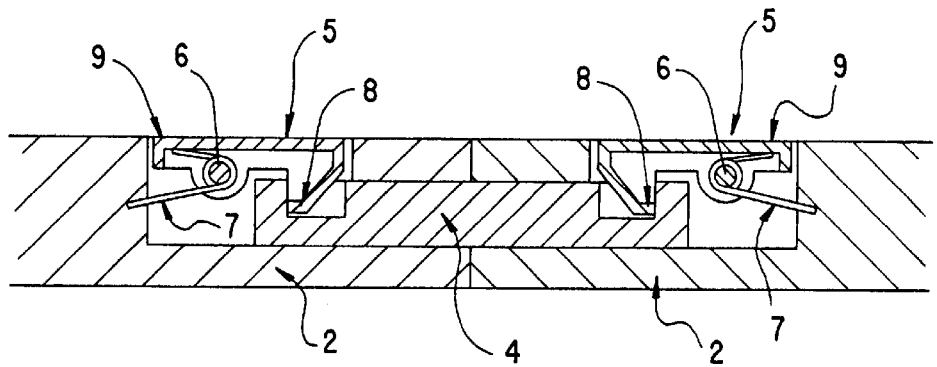
FIG. 3 is a longitudinal sectional view showing the structure of a fixing means.

Examples of the present invention will be explained with referring to the attached drawings. As shown in FIGS. 1 to 3 a top board or slab comprises a plurality of board sections 2 each having on lateral sides an engaging part 3 in the form of recess for receiving a longitudinal half part of a connector 4. The connector 4 is inserted into the engaging part 3 on the board section 2, so that a fixing means 5 formed on the board section 2 is brought into engagement with a fit part or point 11 on the connector 4, thereby allowing a plurality of assembled board sections 2 to be fixed in their connecting state for forming a single top board.

The board section 2 has on lateral sides the engaging part 3 with which a longitudinal half part of the connector 4 engages with the other half part projecting outwards from the board section 2 as seen in FIGS. 1 to 3.

The board section 2 has on the rear surface the fixing means 5 which does, as shown in FIGS. 2 and 3, pivot around an axis 6 and is always biased by a spring 7 to cause a hook 8 to extend in the engaging part 3, so that when a rear end 9 of the fixing means 5 is pressed, the hook 8 turns upwards.

The connector 4 is formed in a shape that a first longitudinal half part of the connector 4 is inserted into the engaging part 3 on the lateral side of one plate section 2. The connector 4 has two fit parts (or points) 11. When the connector 4 is inserted into the engaging part 3, the hook 8 engages the fit part 11 to fix the coupled board section 2 and connecter 4. In this instance, when the rear end 9 is pressed, the hook 8 is released from the fit part 11 to allow the connector 4 to be separated from the board section 2.

Figure 4:
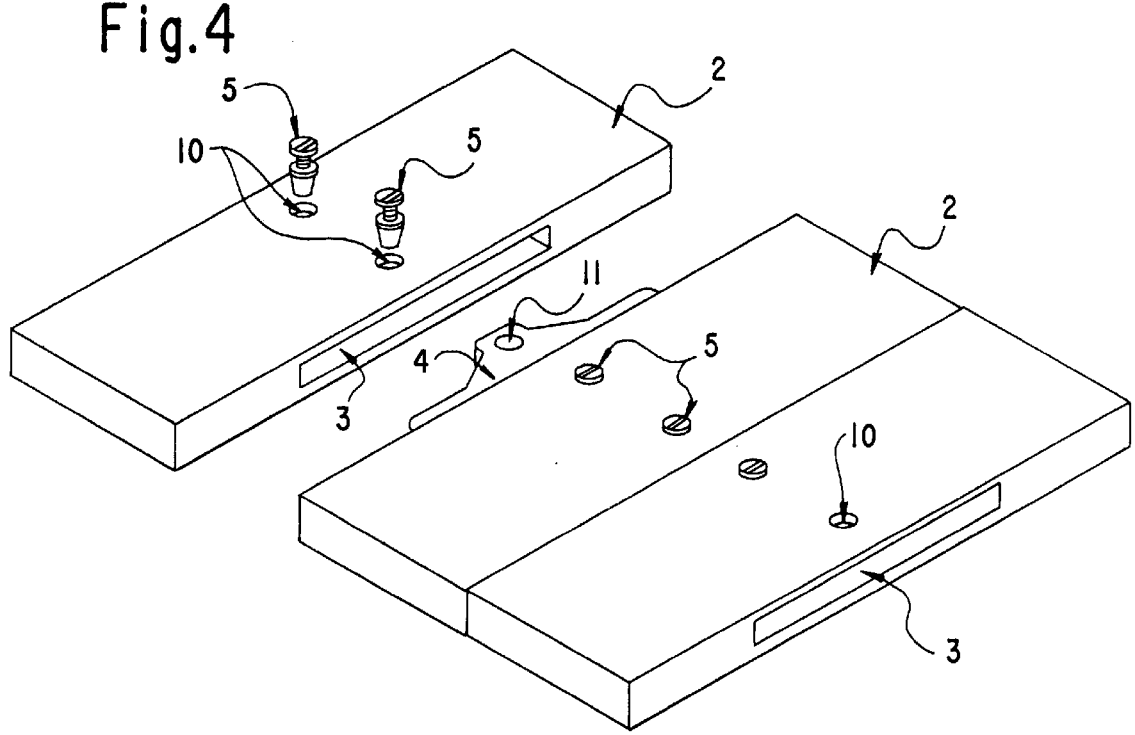
FIG. 4 is a perspective view showing another example of the fixing means.
Figure 5:
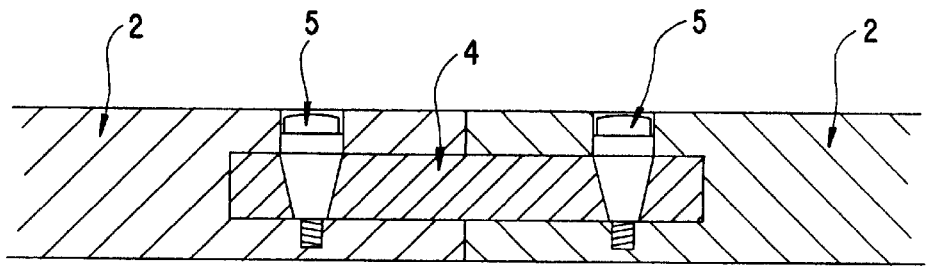
FIG. 5 is a perspective view showing a further example of the fixing means.

The fixing means 5 for which the previous example employs the pivotable metal fitment 5 biased by the spring 7 may be otherwise constructed as shown in FIGS. 4 and 5 that the board section 2 is provided on the rear surface with holes 10 into which a fixing means 5 is inserted to extend through the engaging part 3 in the board section 2. The connector 4 has a fit part or point 11 through which the fixing means 5 extends. The connector 4 is engaged into the engaging part 3 on the board section 2 and the fixing means 5 is inserted into the hole 10 and the fit part 11 to fix the coupled connector(s) 4 and board section(s) 2. The fixing means 5 is removed to disconnect the coupled board section 2 and connector 4.

Figure 6:
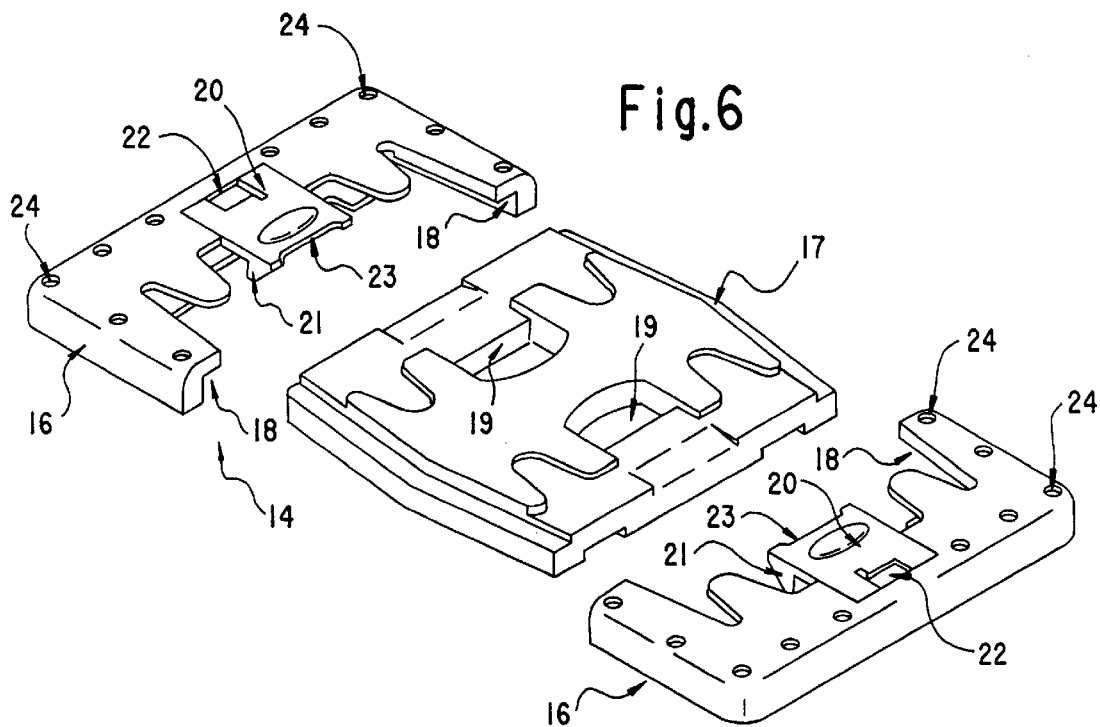
FIG. 6 is a perspective view showing the structure of a connector.
Figure 7:
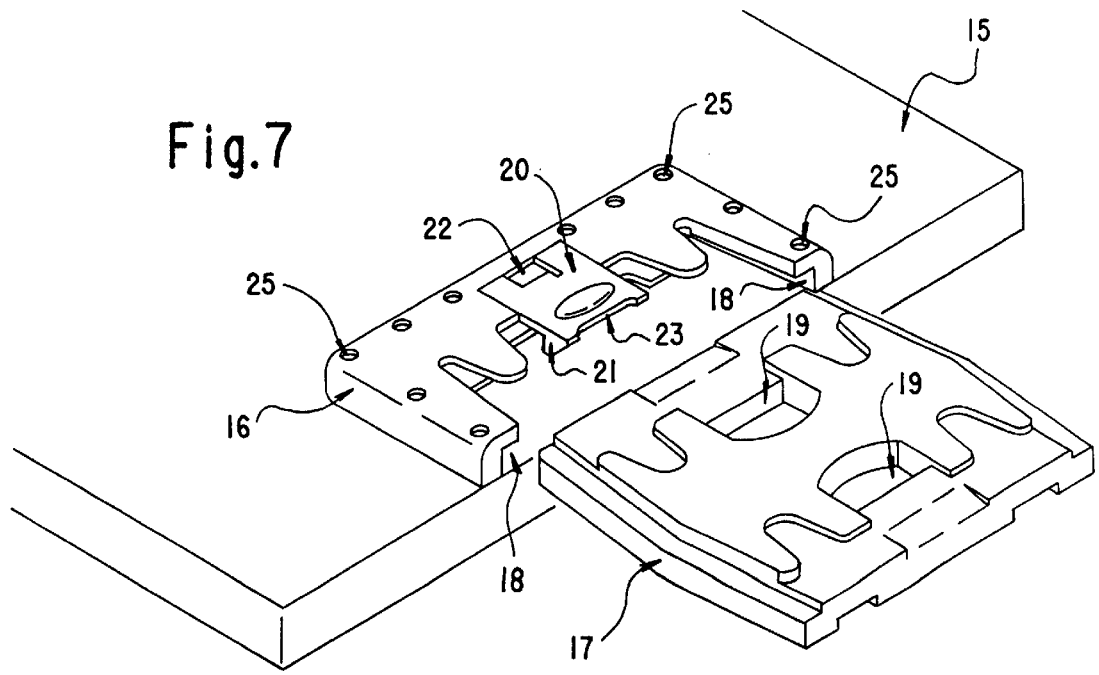
FIG. 7 is a perspective view showing a mounting member installed on the board section.
Figure 8:
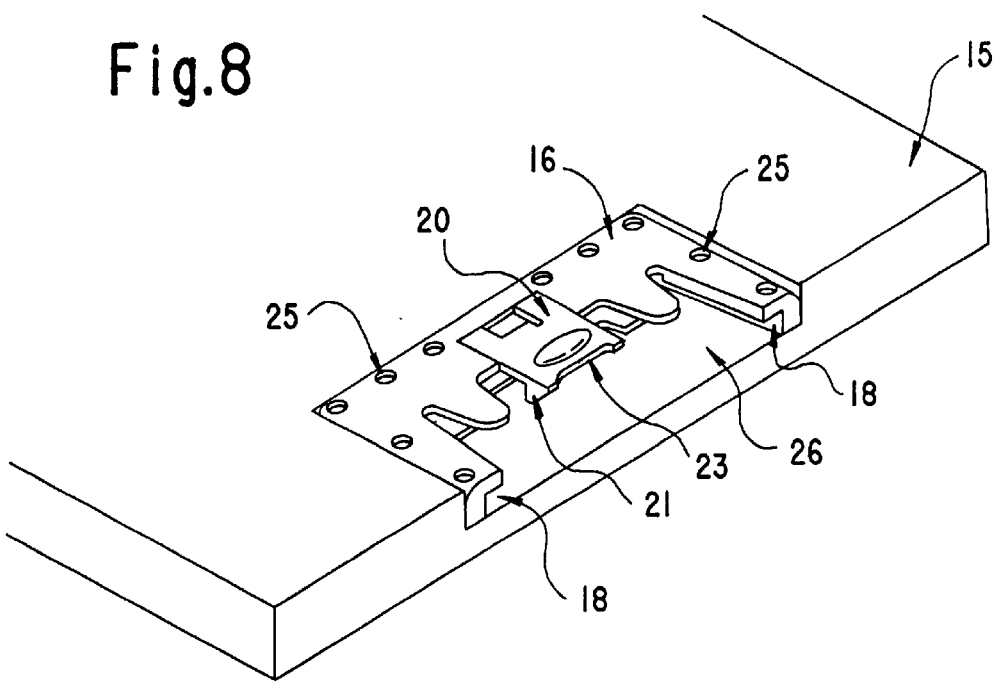
FIG. 8 is a perspective view showing another example of installation of the mounting member fit in the board section.

The connector may be otherwise so constructed as shown in FIGS. 6 to 8 that a connector body 14 comprises a mounting member 16, which is mounted to a board section 15 forming a table, shelves, etc., and a connection member 17 engageable with the mounting member 16. The mounting member 16 has an engaging part 18 for retaining the connection member 17 and a fixing means 20 for engaging with a fit part 19 on the connection member 17. The connection member 17 is adapted to engage at its specific longitudinal half parts with separate or specific mounting members 16. The connection member 17 is inserted into and engaged with the mounting member 16 before engaging the fixing means 20 with the fit part 19, whereby fixing the coupled mouting member 16 and connection member 17.

In brief, the mounting member 16 has on the opposite lateral sides the engaging parts 18 with which the laterial sides of the connection member 17 when inserted engage to be retained.

The fixing means 20 on the mounting member 16 fixes the connection member 17 when engaged with the mounting member 16. In detail, the fixing means 20 comprises an engaging member having at a free end 23 a hook 21 and freely swingably pivoted at a root end around an axis, the engaging member being always biased by a spring 22 to urge the hook 21 downwards, so that the free end 23 may be lifted up by a finger to move the hook 21 upwards.

The mounting member 16 which is of the above construction and to be installed on the board section 15 for constituting a top board, shelves or the like are placed at the edge on the rear surface of the board section 15, as seen in FIG. 7, to be tightened by secrews 25 inserted through mounting bores 24. FIG. 8 illustrates another manner of installation of the mounting member 16 on the board section 15. The board section 15 has at an end on the rear surface a recessed part 26 preliminarily provided correspondingly to the shape of the mounting member 16 which may be fit wholly in the recessed part 26.

The connection member 17 is formed in a shape that the longitudinal half parts may be each engaged with and retained by specific or separate mounting members 16. The connection member 17 has fit parts (or points) 19 into which the hooks 21 on the fixing means 20 may be fit. When the connection member 17 is engaged with the mounting member 16, the hook 21 enters the fit part 19 to fix the coupled mounting member 16 and connection member 17. The end portion 23 of the fixing means 20 may be lifted up by a finger to release the connection between the mounting member and connection member, thereby allowing them to be separated from each other.

Figure 9:
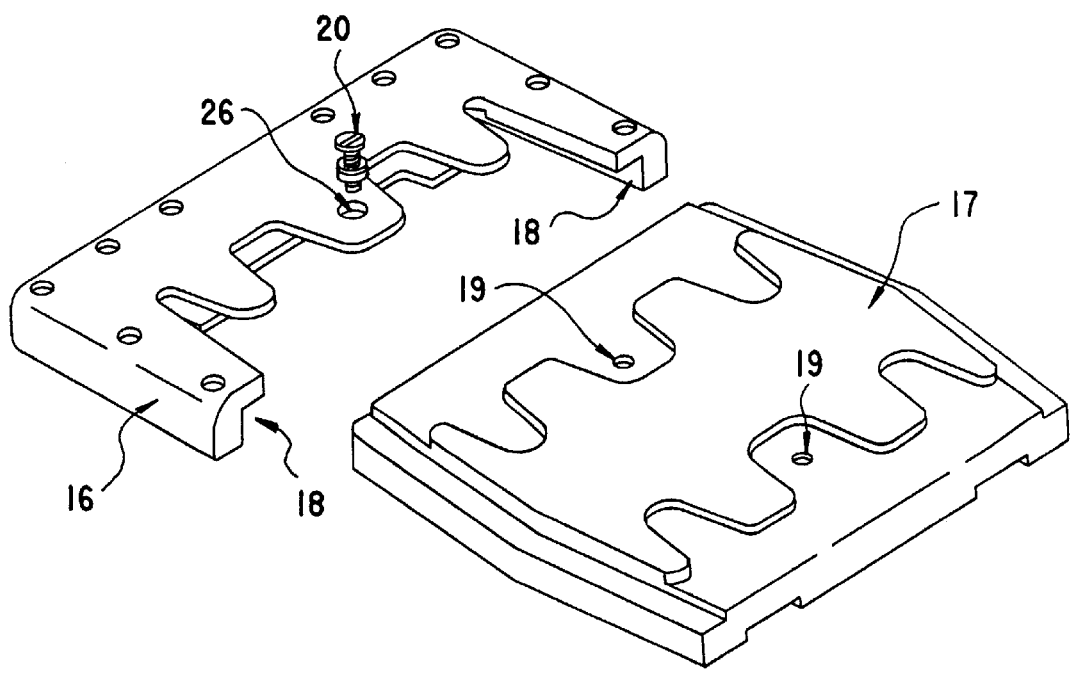
FIG. 9 is a perspective view showing another example of the fixing means on the connector.

The fixing means 20 for which the example uses a swingable metal fitment biased by a spring may be otherwise so constructed as shown in FIG. 9 that the mounting member 16 to be installed on the board section 15 may be of bores 26 into which a fixing means 20 is inserted and extends at a free end to a fit part or point 19 formed on the connection member 17. The connection member 17 is engaged with the mounting member 16 and the fixing means 20 is then inserted into the fit part 19, thereby fixing the coupled connection member and mounting member (in turn, the board section). By removing the fixing means 20 the coupled and fixed connection member and mounting member may be disconnected.

EFFECT OF THE INVENTION

The table top board and the connector for the board sections according to the present invention are constructed as above and enable users to make free arrangement of the top boards, shelves, etc., correspondingly to available space and in their discretion, easily enlarge the extent or size of the top board, shelves, etc., by using an increased number of board sections as required, and simply take apart the top board by operating the fixing means. Thus, the table top board and connector can be conveniently used for a table for outdoor recreation, such as camping, with an excellent portability and improved packing without bulkiness. Also, the board sections may be applied to shelves for household use and also for display in various shops or stores by arranging the shelves boards in size and shape.

Figure 10:
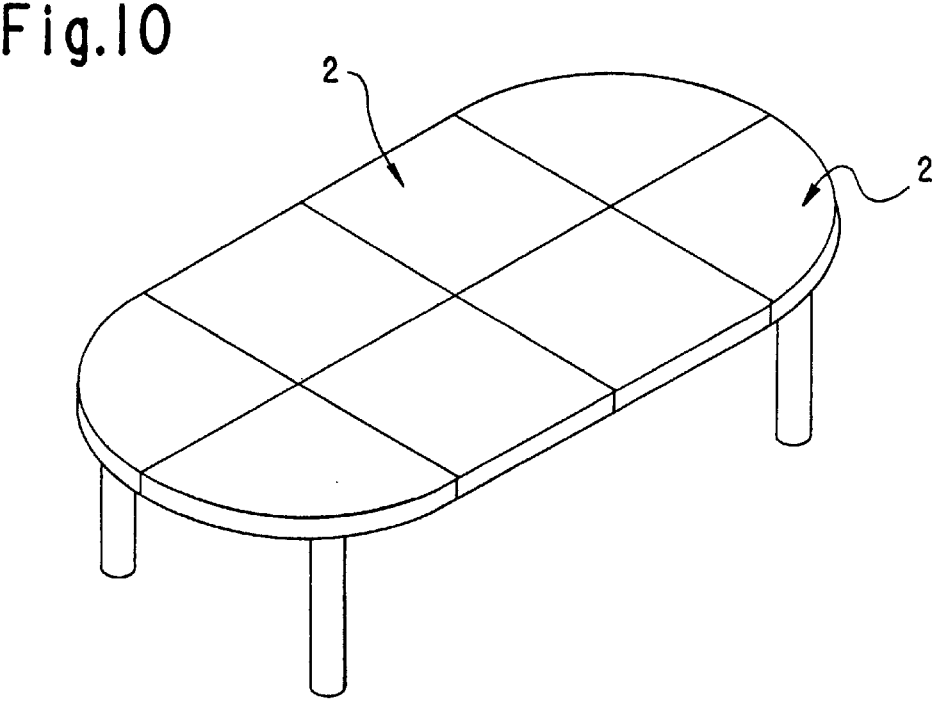
FIG. 10 is a perspective view showing a completed table using the board sections connected by means of the connectors.
Figure 11:
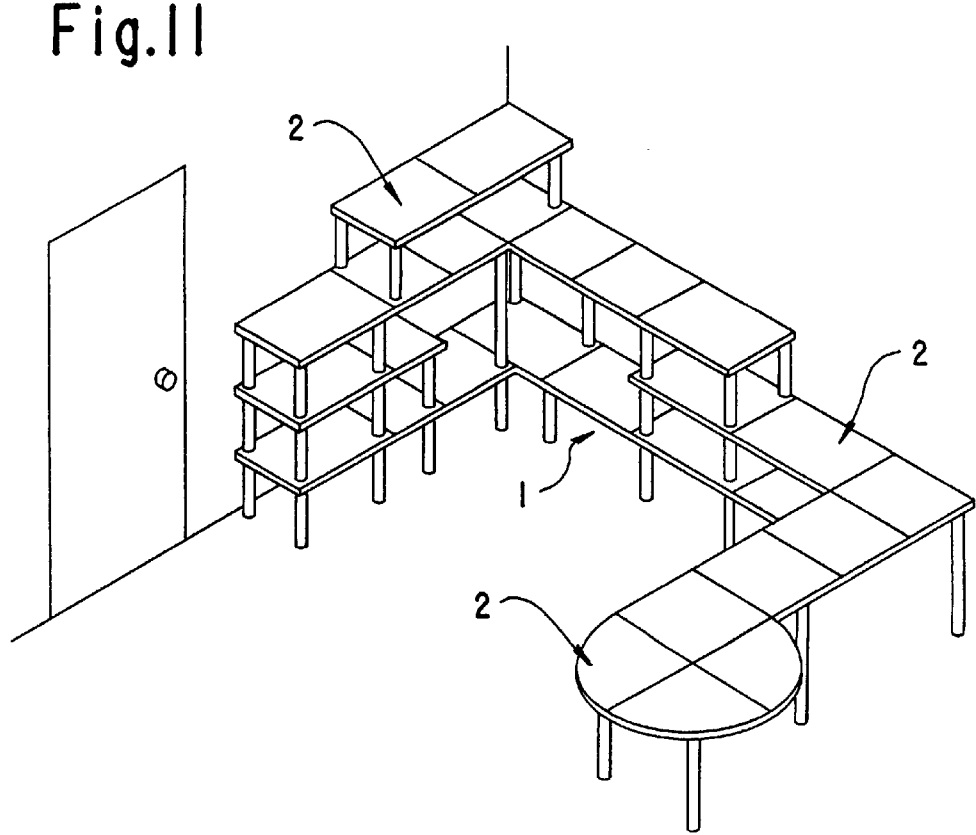
FIG. 11 is a perspective view showing shelves using the board sections.

FIGS. 10 and 11 illustrate examples of the free arrangement and use of the top board by means of a plurality of board sections for a table in FIG. 10 and shelves in FIG. 11 comprising a plurality of top boards with legs forming the steps-like shelves along the walls of the room.

FIGS. 10 and 11 show board sections that are quarter circular shaped and board sections that are connected to other board sections at one side and at least one side.

What we claimed is:

1. A furniture top board comprising:

a plurality of sections each having a top, a bottom and at least one side for connection to at least one side of another section;

a recess, for receiving a connector, formed in the at least one side of each adjacent section being connected, the recess having an opening on the at least one side of each adjacent section and extending therefrom to an endpoint within each section deep enough to accommodate one half of the connector so adjacent sections abut when the adjacent sections are connected;

a spring biased fixing means having a flat side exposed on the bottom of each adjacent section and a side opposite the flat side having a hook extending into the recess, the spring biased fixing means being pivotally mounted on each adjacent section proximate the endpoint of the recess such that the hook can engage the connector when the flat side of the spring biased fixing means is flush with the bottom of the section; and the connector, for connecting two adjacent sections of the furniture top board, being engagable on opposite halves of a longitudinal axis with adjacent sections as well as being separately removable therefrom, the connector being sized so a first half of the connector fits into the recess of a first adjacent section whereby the hook of the spring biased fixing means of the first section engages a first depression on the first half of the connector thereby locking the first half of the connector into the recess and the second half of the connector fits into the recess of the second adjacent section whereby the hook of the spring biased fixing means of the second section engages a second depression on the second half of the connector thereby locking the second half of the connector into the recess of the second section causing the first and second adjacent sections to abut.

2. The furniture top board of claim 1 wherein the spring biased fixing means is metal.

3. A furniture top board comprising:

a plurality of sections each having a top, a bottom and at least one side for connection to at least one side of another section;

a recess, for receiving a connector, formed in the at least one side of each adjacent section being connected, the recess having an opening on the at least one side of each adjacent section and extending therefrom to an endpoint within each section deep enough to accommodate one half of the connector so adjacent sections abut when the adjacent sections are connected;

a fixing means having a first end exposed on the bottom of each adjacent section and a second end opposite the first end extending into the recess, the fixing means being inserted in each adjacent section proximate the endpoint of the recess such that the second end can engage the connector; and the connector, for connecting two adjacent sections of the furniture top board, being engagable on opposite halves of a longitudinal axis with adjacent sections as well as being separately removable therefrom, the connector being sized so a first half of the connector fits into the recess of a first adjacent section whereby the second end of the fixing means of the first section is inserted through a first hole on the first half of the connector thereby locking the first half of the connector into the recess and the second half of the connector fits into the recess of the second adjacent section whereby the second end of the fixing means of the second section is inserted through a second hole on the second half of the connector thereby locking the second half of the connector into the recess of the second section causing the first and second adjacent sections to abut.

4. A furniture top board comprising:

a plurality of sections each having a top, a bottom and at least one side for connection to at least one side of another section;

a mounting member, having a recess for receiving a connector, mounted on the at least one side of each adjacent section being connected, the recess having an opening facing the at least one side of each adjacent section and extending therefrom to the back of the member, the recess being deep enough to accommodate one half of the connector so adjacent sections abut when the adjacent sections are connected, the recess also being shaped for self-alignment with the connector;

a spring biased fixing means mounted on the mounting member having a flat side and a side opposite the flat side having a hook extending into the recess, the spring biased fixing means being pivotally mounted proximate the back of the mounting member such that the hook can engage the connector when the flat side of the spring biased fixing means is horizontal with the bottom of the section; and the connector, for connecting two adjacent sections of the furniture top board, being engagable on opposite halves of a longitudinal axis with the mounting members on adjacent sections as well as being separately removable therefrom, the connector being sized so a first half of the connector fits into the recess of a first mounting member on a first adjacent section whereby the hook of the spring biased fixing means of the first mounting member engages a first depression on the first half of the connector thereby locking the first half of the connector into the recess and the second half of the connector fits into the recess of the second mounting member of the second adjacent section whereby the hook of the spring biased fixing means of the second mounting member engages a second depression on the second half of the connector thereby locking the second half of the connector into the recess of the second section causing the first and second adjacent sections to abut.

5. The furniture top board of claim 4 wherein the spring biased fixing means is metal.

6. A furniture top board comprising:

a plurality of sections each having a top, a bottom and at least one side for connection to at least one side of another section;

a mounting member, having a recess for receiving a connector, mounted in the at least one side of each adjacent section being connected, the recess having an opening facing the at least one side of each adjacent section and extending therefrom to the back of the member, the recess being deep enough to accommodate one half of the connector so adjacent sections abut when the adjacent sections are connected, the recess also being shaped for self-alignment with the connector;

a spring biased fixing means mounted on the mounting member having a flat side and a side opposite the flat side having a hook extending into the recess, the spring biased fixing means being pivotally mounted proximate the back of the mounting member such that the hook can engage the connector when the flat side of the spring biased fixing means is horizontal with the bottom of the section; and the connector, for connecting two adjacent sections of the furniture top board, being engagable on opposite halves of a longitudinal axis with the mounting members on adjacent sections as well as being separately removable therefrom, the connector being sized so a first half of the connector fits into the recess of a first mounting member on a first adjacent section whereby the hook of the spring biased fixing means of the first mounting member engages a first depression on the first half of the connector thereby locking the first half of the connector into the recess and the second half of the connector fits into the recess of the second mounting member of the second adjacent section whereby the hook of the spring biased fixing means of the second mounting member engages a second depression on the second half of the connector thereby locking the second half of the connector into the recess of the second section causing the first and second adjacent sections to abut.

7. The furniture top board of claim 6 wherein the spring biased fixing means is metal.

8. A furniture top board comprising:

a plurality of sections each having a top, a bottom and at least one side for connection to at least one side of another section;

a mounting member, having a recess for receiving a connector, mounted on the at least one side of each adjacent section being connected, the recess having an opening facing the at least one side of each adjacent section and extending therefrom to the back of the member, the recess being deep enough to accommodate one half of the connector so adjacent sections abut when the adjacent sections are connected, the recess also being shaped for self-alignment with the connector;

a fixing means having a first end exposed on the bottom of the mounting member of each adjacent section and a second end opposite the first end extending into the recess, the fixing means being inserted in the mounting member of each adjacent section proximate the endpoint of the recess such that the second end can engage the connector; and the connector, for connecting two adjacent sections of the furniture top board, being engagable on opposite halves of a longitudinal axis with the mounting members on adjacent sections as well as being separately removable therefrom, the connector being sized so a first half of the connector fits into the recess of a first mounting member on a first adjacent section whereby the fixing means of the first mounting member is inserted a first hole on the first half of the connector thereby locking the first half of the connector into the recess and the second half of the connector fits into the recess of the second mounting member of the second adjacent section whereby the fixing means of the second mounting member is inserted in a second hole on the second half of the connector thereby locking the second half of the connector into the recess of the second section causing the first and second adjacent sections to abut.

* * * * *